(12) United States Patent
Jumaine et al.

(10) Patent No.: US 12,331,263 B2
(45) Date of Patent: Jun. 17, 2025

(54) PRODUCTION OF CYLINDER OIL (71) Applicant: A.P. Møller-Mærsk A/S, Copenhagen K (DK)

(72) Inventors: Shamba Jumaine, Copenhagen K (DK); Henrik Bak Weimar, Copenhagen K (DK); Mark Patrick Embleton, Copenhagen K (DK)

(73) Assignee: A.P. Moller-Maersk A/S, Copenhagen K (DK)

( * ) Notice: Subject to any disclaimer, the term of this patent is extended or adjusted under 35 U.S.C. 154(b) by 0 days.

(21) Appl. No.: 18/447,009

(22) Filed: Aug. 9, 2023

(65) Prior Publication Data

US 2023/0416635 A1 Dec. 28, 2023

Related U.S. Application Data (63) Continuation of application No. PCT/EP2022/053287, filed on Feb. 10, 2022.

(30) Foreign Application Priority Data

Feb. 11, 2021 (DK) .............................. PA202100157

(51) Int. Cl.
*C10M 171/02* (2006.01)
*C10M 177/00* (2006.01)
(Continued)

(52) U.S. Cl.
CPC ........ *C10M 171/02* (2013.01); *C10M 177/00* (2013.01); *F01M 3/00* (2013.01);
(Continued)

(58) Field of Classification Search
CPC ..... C10M 171/02; C10M 177/00; F01M 3/00; F01M 3/04; F01M 9/02; C10N 2020/02;
(Continued)

(56) References Cited

U.S. PATENT DOCUMENTS 5,067,455 A 11/1991 Okajima et al.
2012/0322701 A1* 12/2012 Boons ................. C10M 109/00
208/19
2013/0019832 A1 1/2013 Leahy et al.

FOREIGN PATENT DOCUMENTS

CN 111542717 A 8/2020
EP 1298190 A1 4/2003
(Continued)

OTHER PUBLICATIONS

Wärtsilä Corporation, "Wärtsilä Technical Journal", Jan. 1, 2012.
Wärtsilä Corporation, "Warsila Technical Bullitin RT-113", "Sulhur-dependent cylinder oil feed rate", Apr. 10, 2012.
Woodyard, Doug "A Complex Future for Cylinder Oils, Marine Propulsion", System and cylinder oils for two-strokes, Oct. 1, 2011.
(Continued)

*Primary Examiner* — Prem C Singh
*Assistant Examiner* — Francis C Campanell
(74) *Attorney, Agent, or Firm* — EIP US LLP (57) ABSTRACT Disclosed is a method for producing one or more cylinder oils of varying kinematic viscosity for a marine reciprocating internal combustion engine. The method comprises providing a first fluid having a first kinematic viscosity and a first BN, providing a second fluid having a second kinematic viscosity and a second BN, the second kinematic viscosity different from the first kinematic viscosity, and blending the first fluid and the second fluid in a first ratio to produce a first cylinder oil having a kinematic viscosity equal to or less than 14 mm$^2$/s at 100° C.

13 Claims, 3 Drawing Sheets (51) Int. Cl.

| | | |
|---|---|---|
| *F01M 3/00* | (2006.01) | |
| *C10N 20/02* | (2006.01) | |
| *C10N 30/00* | (2006.01) | |
| *C10N 30/02* | (2006.01) | |
| *C10N 40/26* | (2006.01) | |
| *C10N 70/00* | (2006.01) | |

(52) U.S. Cl.
CPC ...... *C10N 2020/02* (2013.01); *C10N 2030/02* (2013.01); *C10N 2030/52* (2020.05); *C10N 2040/26* (2013.01); *C10N 2070/00* (2013.01)

(58) Field of Classification Search
CPC ............ C10N 2030/02; C10N 2030/52; C10N 2040/26; C10N 2070/00; F16N 39/00; F16N 2200/00; F16N 2200/08; F16N 2200/12; F16N 2210/06
USPC .......................................................... 208/18
See application file for complete search history.

(56) References Cited

FOREIGN PATENT DOCUMENTS

| EP | 1640442 | A1 | | 3/2006 | |
|---|---|---|---|---|---|
| EP | 2497817 | A1 | | 9/2012 | |
| EP | 2767578 | A1 | | 8/2014 | |
| EP | 3477181 | A1 | * | 5/2019 | ......... F01M 11/0458 |
| WO | 2006014866 | A1 | | 2/2006 | |
| WO | 2007044909 | A1 | | 4/2007 | |
| WO | 2008073415 | A2 | | 6/2008 | |
| WO | 2011034537 | A1 | | 3/2011 | |
| WO | 2011042412 | A1 | | 4/2011 | |
| WO | 2016070002 | A1 | | 5/2016 | |
| WO | 2017032383 | A1 | | 3/2017 | |
| WO | 2017067561 | A1 | | 4/2017 | |
| WO | 2017080563 | A1 | | 5/2017 | |
| WO | 2018069460 | A1 | | 4/2018 | |
| WO | 2019086398 | A1 | | 5/2019 | |

OTHER PUBLICATIONS

Maersk Group, "Appendix 4B_BOB_Laboratory evaluation case study" Case study: Variable Base Number (BN) Cylinder Oil Blended cylinder oil laboratory evaluation, Sea Mate Blending on Board.
ASTM International, "Standard Test Method for Base Number of Petroleum Products", Base Number of Petroleum Products by Potentiometric Perchloric Acid Titration, Aug. 21, 2019.
Man Diesel, "Service Letter SL09-507HRR Cylinder Lubrication Update", Apr. 1, 2009.
Cimac, "Guildlines for diesel engines lubricants—oil degradation", The International Council on Combustion Engines, Nov. 22, 2004.
Man Diesel, "Sea mate Onboard Blending and Fluid Analysis Systems", May 2009.
Mortier et al, "Chemistry and Technology of Lubricants", 3rd Edition, Jan. 1, 2010.
Man B&W Diesel, "Moves Towards Intelligent Cylinder Lubrication", Apr. 2, 2002.
Castrol Marine, "Castrol aligned with MAN on Cylinder oils Concerns", Nov. 2012.
Product data sheet for Mobilgard 300, Aug. 2018.
Product data sheet for castrol CDX 30, Oct. 9, 2014.
Product data sheet for Shell Melina S Oil.
Chevron, "Product Data Sheet Vertitas 800 Marine SAE 30 and 20", Jan. 2008.
Lukoil Company, "Product Information Sheet_NAVIGO 6 SO", Feb. 1, 2010.
Lukoil Company, "Product Information Sheet_NAVIGO 6 CO", Oct. 1, 2015.
Maersk Fluid Technology, "Sea-Mate Blending on Board", May 16, 2012.
Taiwan Office Action dated Nov. 4, 2022 for Taiwan Application No. 111105123.
Denmark Technical Examination and Search report dated Jun. 16, 2021, for Denmark Application No. PA202100157.
International Search Report and Written Opinion dated Apr. 25, 2022 for International PCT Application No. PCT/EP2022/053287.
Denmark Technical Examination and Search report dated Jun. 30, 2023 for Denmark Application No. PA202300633.

* cited by examiner

PRODUCTION OF CYLINDER OIL

CROSS-REFERENCE TO RELATED APPLICATIONS

This application is a continuation under 35 U.S.C. § 120 of International Application No. PCT/EP2022/053287, filed Feb. 10, 2022 which claims priority to Denmark Application No. PA202100157, filed Feb. 11, 2021, under 35 U.S.C. § 119(a). Each of the above-referenced patent applications is incorporated by reference in its entirety.

BACKGROUND

Field of the Invention

The present invention relates to a method for producing one or more cylinder oils of varying kinematic viscosity for a marine reciprocating internal combustion engine, a method of operating a marine reciprocating internal combustion engine, an apparatus for the preparation of a cylinder oil, and a marine vessel comprising the apparatus for the preparation of a cylinder oil.

Marine vessels, such as container ships, have engines that are powered by heavy fuel oil or the like. Fuel consumption is the largest contributor to the daily running cost of marine vessels. Moreover, the amount of fuel consumed directly corresponds to the amount of pollutants generated (e.g. carbon dioxide ($CO_2$), nitrogen oxides ($NO_x$) and/or sulfur oxides ($SO_x$)). Fuel consumption is influenced by the efficiency of the operation of the engine and/or the speed at which the engine is operated.

Components of engines of marine vessels require lubrication during operation. The effectiveness of the lubrication will affect the efficiency of operation of the engine, and so in turn the amount of fuel consumed during operation of the engine. Friction losses in the engine can be reduced with appropriate lubrication.

Cylinder oil is used for the lubrication of cylinders in marine reciprocating internal combustion engines. Cylinder oil has various functions, including reducing mechanical wear of the piston, piston ring, and cylinder liner by forming an oil film between the piston and/or the piston ring and the cylinder liner, thereby reducing friction between the surfaces.

The ability to form an oil film having suitable lubrication properties between the piston and/or the piston ring and the cylinder liner is at least partially dependent on the viscosity of the cylinder oil. It is taught that a higher viscosity will provide a thicker oil film between the surfaces, thereby providing greater control of wear. Cylinder oils typically have a viscosity of at least 18.5 $mm^2/s$ at 100° C. Both leading non-profit associations such as CIMAC, and manufacturers of marine reciprocating internal combustion engines, state that cylinder oils must have an SAE (Society of Automotive Engineering) viscosity grade of SAE 50 (a viscosity of at least 16.3 $mm^2/s$ at 100° C.) for safe operation of a marine reciprocating internal combustion engine such as a two-stroke crosshead engine. Cylinder oils having a lower kinematic viscosity are taught to have inferior lubrication properties, because the thinner oil film formed between the surfaces leads to increased engine component wear, higher scuffing, and higher corrosion.

A further function of cylinder oil is to reduce corrosion of the material of the piston and the material of the liner by neutralising sulfur acids formed by the combustion of sulfur-containing fuel. The ability to reduce corrosion of the piston and the cylinder liner is at least partially dependent on the alkalinity of the cylinder oil, referred to as the Base Number (BN) of the cylinder oil. The BN is typically expressed in terms of milligrams of potassium hydroxide per gram of oil (mg KOH/g). For marine applications, cylinder oils typically have a BN of from 25 to 140, depending on the sulfur content of the fuel used to power the engine. However, due to variations in sulfur content of fuel or engine load, the required BN of the cylinder oil may vary during operation of the engine.

Marine vessels can be provided with a blending system to produce on-board cylinder oils of varying alkalinity in response to the varying requirements during operation of the engine. The process is dictated by the target BN of the required cylinder oil, and does not take into account a target kinematic viscosity.

Embodiments of the present invention aim to enable reduction in fuel consumption and the amount of pollutants generated during operating of a marine reciprocating internal combustion engine while addressing the aforementioned problems.

SUMMARY

A first aspect of the present invention provides a method for producing one or more cylinder oils of varying kinematic viscosity for a marine reciprocating internal combustion engine, the method comprising: providing a first fluid having a first kinematic viscosity and a first BN; providing a second fluid having a second kinematic viscosity and a second BN, the second kinematic viscosity different from the first kinematic viscosity; and blending the first fluid and the second fluid in a first ratio to produce a first cylinder oil having a kinematic viscosity equal to or less than 14 $mm^2/s$ at 100° C.

The inventors have identified that providing a cylinder oil of reduced kinematic viscosity (e.g. below the minimum kinematic viscosity recommended by the engine manufacturer) allows for lubrication of a cylinder oil with reduced friction losses during operation of the engine. The lower viscosity of the cylinder oil means that a thinner oil film is formed between the piston and the cylinder liner, which leads to a reduction in hydrodynamic friction. The reduction in friction losses leads to reduced fuel consumption during operation of the engine, and thus a reduction in the amount of pollutants generated.

Surprisingly, the inventors have further identified that the reduced kinematic viscosity does not have a significant negative effect on the ability of the oil to control wear of the piston and/or cylinder liner, and in examples provides greater control of engine component wear. Thus, for the first time the inventors have provided a cylinder oil having low kinematic viscosity which can be reliably used in a marine reciprocating internal combustion engine.

Optionally, the method is carried out offshore, such as on board a marine vessel. Advantageously, performing the method on board a marine vessel compared with on shore allows for adapting properties of the cylinder oil to meet the requirements of the engine during operation.

All kinematic viscosities described herein are measured at a temperature of 100° C., unless otherwise stated. The kinematic viscosity of an oil at 100° C. can be expressed in centistokes (cSt). Accordingly, the first cylinder oil having a kinematic viscosity equal to or less than 14 $mm^2/s$ at 100° C. is the same as 14 cSt. In examples, the first cylinder oil has a kinematic viscosity equal to or less than 13.5 $mm^2/s$, or equal to or less than 13 $mm^2/s$, or equal to or less than 12.5 mm²/s, or equal to or less than 10 mm²/s. In examples, the first cylinder oil has a kinematic viscosity equal to or greater than 8 mm²/s, such as from 8 mm²/s to 14 mm²/s, or from 8 mm²/s to 12.5 mm²/s, or from 8 mm²/s to 10 mm²/s.

Optionally, the first cylinder oil has a kinematic viscosity corresponding to SAE Viscosity Grade SAE 40, or SAE 30, or SAE 20. The first cylinder oil has any suitable viscosity index for use in lubricating the piston liner and piston rings in the cylinder of an engine. In examples, the first cylinder oil has a viscosity index of from 59 to 120.

Optionally, the first cylinder oil has a BN of from 15 to 160 mg KOH/g, or from 25 to 150 mg KOH/g, or from 40 to 140 mg KOH/g, or from 50 to 120 mg KOH/g.

Optionally, the method comprises determining, based on an engine operation parameter and/or an engine condition parameter, a target kinematic viscosity for the first cylinder oil.

Optionally, the method comprises determining, based on a parameter set including the first kinematic viscosity and second kinematic viscosity, a target ratio range of the first fluid to the second fluid that corresponds to the target kinematic viscosity of the first cylinder oil; and performing the blending of the first fluid and second fluid such that the first ratio is set within the target ratio range that corresponds to the target kinematic viscosity of the first cylinder oil. Accordingly, the cylinder oil is adapted to have a kinematic viscosity suitable for the operation and/or condition of the engine during operation of the engine.

Optionally, for any target ratio range described herein, the upper bound of the target ratio range is equal to the lower bound of the target ratio range. For example, the target ratio range is a single target ratio, and the blending is performed such that the first ratio is the first target ratio.

Optionally, the blending comprises blending with the first fluid and the second fluid a third fluid having a third kinematic viscosity and a third BN to produce the first cylinder oil. The third fluid is blended with the first and second fluids in a ratio to produce the first cylinder oil. Providing a third fluid allows for control of both the kinematic viscosity and the alkalinity of the first cylinder oil.

Optionally, the method comprises determining, based on an engine operation parameter or an engine condition parameter, a target BN for the first cylinder oil.

Optionally, the method comprises determining, based on a parameter set including at least the first BN, the second BN, and the third BN, a target ratio range of the first fluid to the second fluid that corresponds to the target BN of the first cylinder oil; and performing the blending such that the first ratio is set within the target ratio that corresponds to the target BN of the first cylinder oil. In examples, the parameter set also includes at least one of: the kinematic viscosity of the first fluid; the kinematic viscosity of the second fluid; the kinematic viscosity of the third fluid; and the BN of the third fluid. In examples, the determining further comprises determining a ratio of third fluid to first fluid, and/or a ratio of third fluid to second fluid. For example, the determining includes determining an amount of first fluid, second fluid, and third fluid to blend together to produce the first cylinder oil.

Optionally, the method further comprises producing a second cylinder oil having a kinematic viscosity greater than the kinematic viscosity of the first cylinder oil by blending the first fluid and the second fluid in a second ratio different from the first ratio. During operation of a marine engine the lubrication requirements of the cylinder will typically change over time. For example, the engine is operated at a different speed. In examples, the second cylinder oil has a kinematic viscosity adapted for the new lubrication requirements of the cylinder. The second cylinder oil has any suitable kinematic viscosity. In examples, the second cylinder oil has a kinematic viscosity below the minimum kinematic viscosity recommended by engine manufacturers, such as a kinematic viscosity equal to or less than 14 mm²/s, or equal to or less than 13.5 mm²/s, or equal to or less than 13 mm²/s, or equal to or less than 12.5 mm²/s, or equal to or less than 10 mm²/s. In examples, the second cylinder oil has a kinematic viscosity equal to or greater than 8 mm²/s, such as from 8 mm²/s to 14 mm²/s, or from 8 mm²/s to 12.5 mm²/s, or from 8 mm²/s to 10 mm²/s. In other examples, the second cylinder oil has a kinematic viscosity greater than 14 mm²/s, such as greater than or equal to 16.5 mm²/s (e.g. a kinematic viscosity within the engine manufacturer's recommended kinematic viscosity range).

Optionally, the first cylinder oil has a BN different from the second cylinder oil. During operation of the engine the sulfur content of the fuel oil may change, for example, leading to a different amount of sulfur acids being produced. Providing a second cylinder oil having a BN different from the first cylinder oil can means that the cylinder is provided with cylinder oil of suitable alkalinity.

Optionally, the second cylinder oil has a BN of from 15 to 160 mg KOH/g, or from 25 to 150 mg KOH/g, or from 40 to 140 mg KOH/g, or from 50 to 120 mg KOH/g.

Optionally, the method comprises determining, based on an engine operation parameter or an engine condition parameter, a target kinematic viscosity for the second cylinder oil.

Optionally, the method comprises determining, based on a parameter set including the first kinematic viscosity and second kinematic viscosity, a target ratio range of the first fluid to the second fluid that corresponds to the target kinematic viscosity of the second cylinder oil; and performing the blending of the first fluid and second fluid such that the second ratio is set within the target ratio range that corresponds to the target kinematic viscosity of the second cylinder oil.

Optionally, the method comprises determining, based on an engine operation parameter or an engine condition parameter, a target BN of the second cylinder oil.

Optionally, the producing the second cylinder oil comprises blending the first fluid and the second fluid with a third fluid having a third kinematic viscosity and a third BN to produce the second cylinder oil, the method comprising: determining, based on a parameter set including at least the first BN, the second BN, and the third BN, a target ratio range of the first fluid to the second fluid that corresponds to the target BN of the second cylinder oil; and performing the blending such that the second ratio is set within the target ratio that corresponds to the target BN of the second cylinder oil. In examples, the determining further comprises determining a ratio of third fluid to first fluid, and/or a ratio of third fluid to second fluid. For example, the determining includes determining an amount of first fluid, second fluid, and third fluid to blend together to produce the second cylinder oil.

Optionally, the engine operation parameter or engine condition parameter is at least one of: fuel sulfur-content; engine load; engine speed; relative air humidity; cylinder ferrous wear emission, total iron wear emission, iron oxide emission; cylinder lubricant residual BN; and cylinder oil liner temperature.

Optionally, the first fluid is a system oil. In examples, the system oil has a kinematic viscosity of from 10 to 15 mm²/s. Typically, the system oil has a kinematic viscosity corresponding to SAE viscosity grade SAE 30; for example, the system oil has a kinematic viscosity of from 11 to 12 mm$^2$/s. In examples, the system oil is an at least partially used system oil, such as a used system oil. The use of a used system oil reduces the cost of operation of the engine. In other examples, the system oil is a fresh (virgin) oil. The system oil typically has a BN of from 5 to 30, such as 5 to 10. In examples, such as where the system oil is a fresh cylinder oil, the system oil has a BN from 5 to 8.

Optionally, the second fluid is an additive package, fresh cylinder oil, or used cylinder oil.

Optionally, the third fluid is a base oil. In examples, the base oil has a kinematic viscosity of from 3 to 8 mm$^2$/s. Typically, the base oil has a kinematic viscosity corresponding to SAE viscosity grade SAE 20; for example, the base oil has a kinematic viscosity of from 4 to 7 mm$^2$/s. Advantageously, base oil is typically low cost, and therefore including base oil in the blending reduces the cost of producing a cylinder oil. The base oil typically has a BN of less than 1, such as less than 0.5, or less than 0.1.

Optionally, at least one of the first fluid, second fluid, or third fluid is an at least partially used oil, for example a used oil. Use of a used system oil reduces the cost of operation of the engine.

Optionally, at least one of the first fluid, second fluid, and (if present) third fluid is a monograde oil; for example, each of the first fluid, second fluid, and (if present) third fluid is a monograde oil. Optionally, at least one of the first fluid, second fluid, and (if present) third fluid is a multigrade oil; for example, each of the first fluid, second fluid, and (if present) third fluid is a multigrade oil.

Optionally, the first cylinder oil and/or the second cylinder oil is an all-loss cylinder oil.

A second aspect of the present invention provides a method of operating a marine reciprocating internal combustion engine, the method comprising: producing a cylinder oil by a method described hereinabove, the cylinder oil having a kinematic viscosity equal to or less than 14 mm$^2$/s at 100° C.; and supplying the cylinder oil to a cylinder of the marine reciprocating internal combustion engine.

Surprisingly, the inventors have identified that safe operation of a marine internal reciprocating engine, such as a two-stroke crosshead engine, can be maintained with a cylinder oil having a viscosity below 14 mm$^2$/s.

Optionally, the kinematic viscosity of the cylinder oil is lower than the manufacturer's recommended minimum cylinder oil kinematic viscosity for the marine reciprocating internal combustion engine.

Optionally, the marine reciprocating internal combustion engine is operating at an engine load of 60% or less. For example, the engine may be operating at a speed significantly lower than the engine's maximum speed (sometimes referred to as "slow steaming"). In other examples, the marine reciprocating internal combustion engine is operating at an engine load greater than 60%, such as up to 70% or 80%.

Optionally, the marine reciprocating internal combustion engine is a two-stroke crosshead engine. In examples, the two-stroke crosshead engine is a low-speed engine.

A third aspect of the present invention provides an apparatus for the preparation of a cylinder oil comprising: a blender; a first container for containing a first fluid having a first kinematic viscosity and a first BN, the first container in selectable fluid communication with the blender; a second container for containing a second fluid having a second kinematic viscosity and a second BN; the second container in selectable fluid communication with the blender; and a controller configured to determine an amount of first fluid and an amount of second fluid to supply to the blender for providing a cylinder oil having a desired target viscosity and a target BN, the target kinematic viscosity equal to or less than 14 mm$^2$/s at 100° C.

Optionally, the controller is configured to cause the blender to blend the first fluid and second fluid in the determined ratio (e.g. to blend the determined amount of first fluid and the determined amount of second fluid) to produce the cylinder oil.

Optionally, the apparatus is on board a marine vessel.

Optionally, the first container contains the first fluid. The first fluid is, for example, system oil.

Optionally, the second container contains the second fluid. The second fluid is, for example, an additive package, fresh cylinder oil, or used cylinder oil.

Optionally, the apparatus further comprises a third container for containing a third fluid having a third kinematic viscosity and a third BN, the third container in selectable fluid communication with the blender. The third container for example contains the third fluid, such as base oil.

Optionally, the apparatus comprises a storage tank for storing cylinder oil prepared with the apparatus. The storage tank is connected to the blender via a conduit, which optionally is provided with a valve to allow for selectable fluid communication of the storage tank with the blender and/or a pump for pumping produced cylinder oil from the blender to the storage tank. Optionally, the storage tank is in selectable fluid communication with a cylinder liner of a cylinder via, for example, a valve for controlling flow of cylinder oil from the storage tank to the cylinder liner and/or a pump for pumping cylinder oil from the storage tank to the cylinder liner.

Optionally, the blender of the apparatus is in selectable fluid communication with a cylinder liner of a cylinder, for providing the produced cylinder oil to the cylinder liner.

Optionally, the controller comprises a memory and one or more processor(s), and is communicatively connected to, and for controlling, each of: a first valve for controlling flow of first fluid from the first container to the blender and/or a first pump for pumping first fluid from the first container to the blender; a second valve for controlling flow of first fluid from the second container to the blender and/or a second pump for pumping second fluid from the second container to the blender; optionally a third valve for controlling flow of third fluid from the third container and/or a third pump for pumping third fluid from the third container to the blender; and the blender.

Optionally, the controller is configured to receive data indicative of an engine condition parameter and/or an engine operation parameter and/or a fluid condition parameter.

A fourth aspect of the present invention provides a marine vessel comprising the apparatus described hereinabove with respect to the third aspect.

Optionally, the marine vessel is a cargo vessel such as a container ship, a tanker, a dry-bulk carrier or a reefer ship. Optionally, the marine vessel is a passenger vessel.

Optionally, the marine vessel is a container ship.

Features described in relation to one aspect of the invention are explicitly disclosed in combination with any and all other aspects to the extent that they are compatible.

Further features and advantages of the invention will become apparent from the following description of preferred embodiments of the invention, given by way of example only, which is made with reference to the accompanying drawings.

BRIEF DESCRIPTION OF THE DRAWINGS

Embodiments of the invention will now be described, by way of example only, with reference to the accompanying drawings, in which.

DETAILED DESCRIPTION

Figure 1:
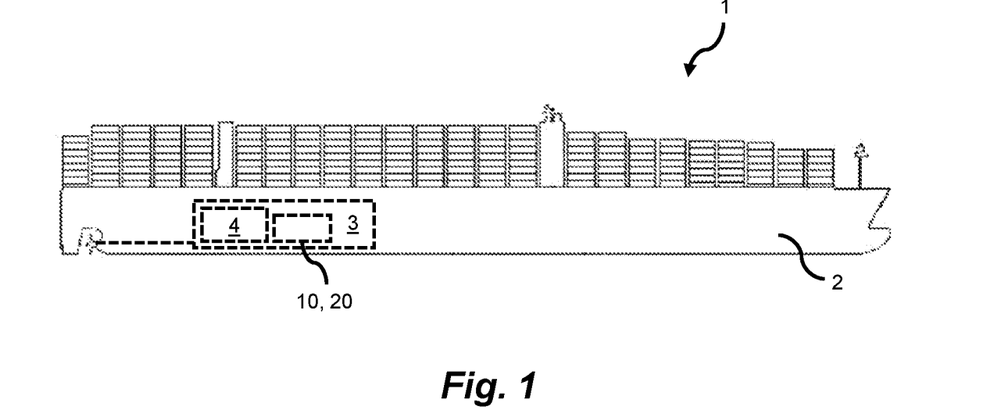
FIG. 1 shows a schematic side view of an example of a marine vessel according to an embodiment of the present invention.

FIG. 1 shows a schematic side view of an example of a marine vessel according to an example. In this embodiment, the vessel is a container ship 1. In other embodiments, the marine vessel may be another form of cargo vessel, such as a tanker, a dry-bulk carrier or a reefer ship, or a passenger vessel or any other marine vessel that uses cylinder oil.

The marine vessel 1 has a hull 2 and one or more engine rooms 3 inside the hull 2. The marine vessel 1 is powered by one or more large internal combustion engines 4, such as four-stroke or two-stroke self-igniting combustion engines 4, located in an engine room 3. The engine(s) 4 drive(s) a propulsion mechanism (such as one or more propellers). The vessel 1 may also comprise one or more auxiliary engines (known as generator sets) the provide power and/or heat for various consumers of power aboard the vessel 1. The vessel 1 also comprises an apparatus for preparing cylinder oil 10, 20 for supplying cylinder oil to the engine(s) 4. The apparatus 10, 20 may be any apparatus for preparing cylinder oil described herein as an embodiment of the present invention, such as that shown in FIG. 2 or that shown in FIG. 3.

The engine 4 is a marine two-stroke internal combustion engine. In the example shown in FIG. 1, the engine 4 is powered by marine heavy fuel oil. In other examples (not shown), the marine two-stroke internal combustion engine is powered by a fuel other than heavy fuel oil, such as marine light oil, marine diesel oil, marine gas oil, liquid natural gas, liquid petroleum gas, biofuel, methanol, ethanol, ammonia, hydrogen, methane, biomethane, or a combination thereof. In these examples, the fuel can be natural or synthetic. The two-stroke internal combustion engine is any suitable engine, such as a diesel uniflow engine, or an Otto cycle engine. The skilled person will be familiar with the components and systems of a marine vessel 1, and so further detailed discussion thereof is omitted for brevity.

Figure 2:
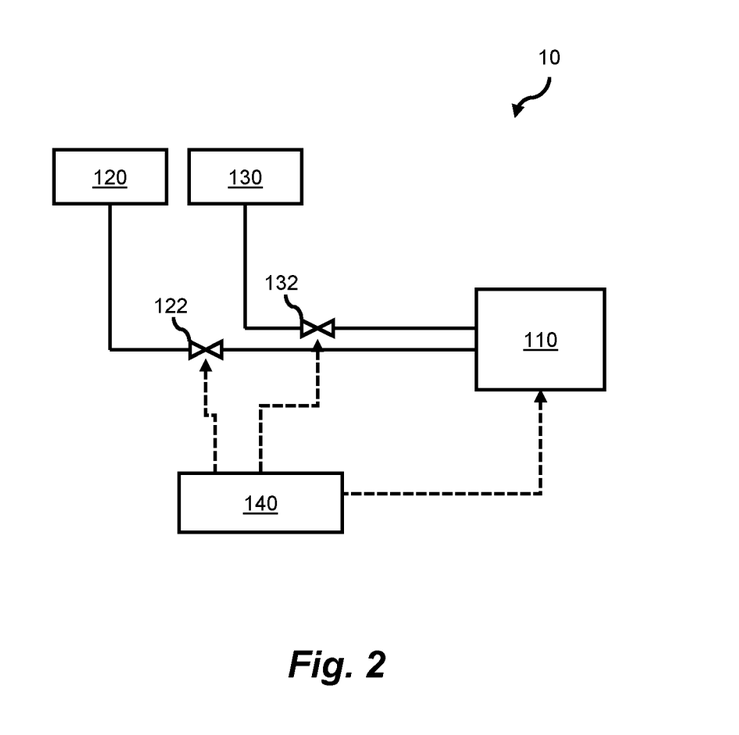
FIG. 2 shows a schematic view of an example apparatus for the preparation of a cylinder oil according to an embodiment of the present invention.

FIG. 2 shows a schematic view of an apparatus 10 for preparing a cylinder oil according to an example. The apparatus 10 is for supplying cylinder oil to the cylinder liner of a cylinder of an engine, such as an engine 4 of a marine vessel shown in FIG. 1 or any variants thereof described herein.

Broadly speaking, the apparatus 10 comprises a blender 110 for blending fluids to provide a cylinder oil; a first container 120 for containing a first fluid having a first kinematic viscosity and a first BN, the first container 120 in selectable fluid communication with the blender 110; a second container 130 for containing a second fluid having a second kinematic viscosity and a second BN, the second container 130 in selectable fluid communication with the blender 110; and a controller 140 configured to determine an amount of first fluid and an amount of second fluid to supply to the blender 110 (e.g. a ratio of first fluid to second fluid) for providing a cylinder oil having a desired target viscosity and a target BN, the target kinematic viscosity equal to or less than 14 mm$^2$/s. In examples, the controller 140 is further configured to cause the blender 110 to blend the first fluid and second fluid in the determined ratio.

More specifically, in FIG. 2, the first container 120 is connected to the blender 110 via a valve 122 through which the first fluid flows from the first container 120 to the blender 110. The valve is for controlling the flow of first fluid from the first container 120 to the blender 110. For example, the valve is closable to prevent or hinder flow of the first fluid from the first container 120 to the blender 110, and openable to allow flow of the first fluid from the first container 120 to the blender 110. Thus, the first container 120 is in selectable fluid communication with the blender 110. Optionally, the valve 122 can be operated to allow a restricted flow of first fluid from the first container 120 to the blender 110 (e.g. the valve 122 can be "partially" closed, or "partially" opened). The valve is operable manually, or via a controller, described further herein. In other examples (not shown), the first container 120 is in selectable fluid communication with the blender 110 via a pump for pumping first fluid from the first container 120 to the blender 110.

In examples, the first container 120 contains first fluid, such as system oil. A system oil is oil suitable for use in a crankcase lubrication system of a slow speed two-stroke marine diesel engines. The system oil may be a virgin oil (e.g. has not been used in a crankcase lubrication system), in which case the first container 120 is typically a storage tank for storing virgin system oil. Alternatively, the system oil is an at least partially used system oil, e.g. a system oil which has been circulated around a crankcase lubrication system. In which case, in examples the first container 120 is a storage tank for storing used system oil. Such a used system oil storage tank is, in examples, fluidly connected with the crankcase to receive used system oil from the crankcase. In examples, the used system oil storage tank is connected to the crankcase via a pump to pump used system oil from the crankcase to the used system oil tank. In other examples where the system oil is an at least partially used system oil, the first container 120 is within, or is, the crankcase of the engine. For example, the first container 120 is a sump in the crankcase of the engine.

In FIG. 2 the second container 130 is connected to the blender 110 via a valve 132 through which the second fluid flows from the second container 130 to the blender 110. More specifically, the valve is for controlling the flow of second fluid from the second container 130 to the blender 110. For example, the valve may be closable to prevent or hinder flow of the second fluid from the second container 130 to the blender 110, and openable to allow flow of the second fluid from the second container 130 to the blender 110. Thus, the second container 130 is in selectable fluid communication with the blender 110. Optionally, the valve 132 can be operated to allow a restricted flow of second fluid from the second container 130 to the blender 110 (e.g. the valve 132 can be "partially" closed, or "partially" opened). The valve 132 is operable manually, or via a controller, described further herein. In other examples (not shown), the second container 130 is connected to the blender 110 via a pump for pumping second fluid from the second container 130 to the blender 110.

In examples, the second container 130 contains second fluid, such as an additive package, virgin cylinder oil, or at least partially used cylinder oil (e.g. cylinder oil which has been delivered to a cylinder for lubricating the piston and cylinder liner, and subsequently collected).

Where the second fluid is an additive package, the second container 130 is a storage tank for storing additive package. An additive package typically comprises base oil and one or more additives, such as overbased and/or neutral detergents (metallic alkaline salts) and optionally other performance additives. The additive package typically has a high kinematic viscosity (often from 50 to 200 mm$^2$/s at 100° C., such as 100 mm$^2$/s or greater) and a high BN (often from 150 to 400).

Where the second fluid is a virgin cylinder oil (e.g. cylinder oil which has not yet been used to lubricate a piston and cylinder liner), the second container 130 is a storage tank for storing cylinder oil. The virgin cylinder oil typically has a kinematic viscosity of from 16 to 21 mm$^2$/s, and a BN of from 15 to 145.

Where the second fluid is a used cylinder oil (e.g. a cylinder oil which has at some point been used to lubricate a piston and cylinder liner), the second container 130 is, in some examples, a storage tank for storing used cylinder oil. In other examples, used cylinder oil is alternatively or additionally provided to the blender directly from the cylinder. In which case, the second container 130 is a cylinder of the engine.

The apparatus 10 comprises a controller 140 for controlling the apparatus 10. The controller 140 comprises a memory and one or more processors. The memory circuitry is arranged to store machine-readable instructions which, when executed by the one or more processors, cause the controller to perform a method as described herein. In examples, the controller 140 is communicatively connected to, and for controlling, each of: the first valve 122 for controlling flow of first fluid from the first container 120 to the blender 110; the second valve 132 for controlling flow of second fluid from the second container 130 to the blender 110; and the blender 110. In some examples, some or all of these elements are controlled by an entity other than the controller 140.

The controller 140 is configured to determine the ratio of fluids required to provide a cylinder oil. For example, the controller 140 is configured to determine a ratio of first fluid and second fluid corresponding to the amount of first fluid and second fluid to be delivered to the blender 110 for providing a cylinder oil. Accordingly, the controller 140 is configured to control the first valve 122 to provide a controlled amount of first fluid to the blender 110 according the determined ratio, and to control the second valve 132 to provide a controlled amount of second fluid to the blender 110 according the determined ratio. The ratio is typically a mass ratio (and thus the controller 140 is configured to determine a mass of first fluid and a mass of second fluid to be delivered to the blender 110), but may in some cases be a volume ratio (and thus the controller 140 is configured to determine a volume of first fluid and a volume of second fluid to be delivered to the blender 110).

In examples the controller 140 is configured to determine the ratio of fluids based on data received from one or more other entities (not shown). In some examples, the controller 140 is configured to receive data from one or more user input device(s) (not shown) to which a user has provided information, such as a target kinematic viscosity. Upon receipt of data indicative of the target kinematic viscosity, the controller 140 is configured to determine the ratio of fluids required to provide a cylinder oil having the target viscosity, e.g. based on data from a lookup table stored in a memory of the controller 140 (e.g. containing information regarding the kinematic viscosity and/or viscosity index of the first and second fluids) and/or based on an algorithm equation stored in the memory of the controller 140. In other examples, the controller is configured to receive data indicative of an engine condition parameter or engine operation parameter, described in more detail with regard to FIG. 3. In other examples, the controller is configured to receive data indicative of a fluid condition parameter in respect of the first fluid, the second fluid, the produced cylinder oil, or any combination thereof. For example, the controller is configured to receive data indicative of the kinematic viscosity, the alkalinity (BN), and/or the temperature of the first fluid, the second fluid, the produced cylinder oil, or any combination thereof.

The controller 140 is configured to determine an amount of first fluid and an amount of second fluid to supply to the blender 110 for providing a cylinder oil having a target kinematic viscosity equal to or less than 14 mm$^2$/s.

Figure 3:
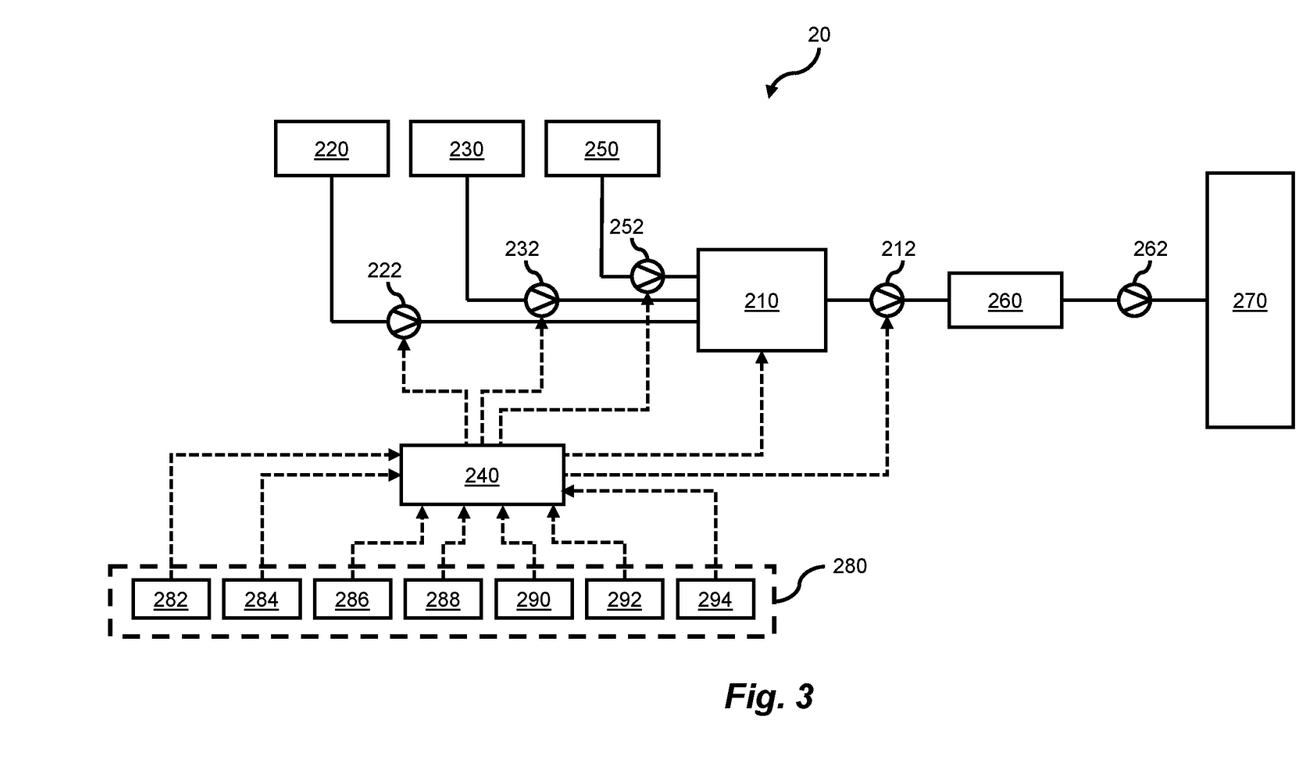
FIG. 3 shows a schematic view of an example apparatus for the preparation of a cylinder oil according to another embodiment of the present invention.

FIG. 3 shows a schematic view of an apparatus 20 for preparing a cylinder oil according to another example. Some elements of the apparatus 20 shown in FIG. 3 correspond to elements already described in relation to FIG. 2, in which case the reference symbol is the reference symbol used in FIG. 2, increased by 100.

Broadly speaking, the apparatus 20 comprises a blender 210 for blending fluids to provide a cylinder oil; a first container 220 for containing a first fluid having a first kinematic viscosity and a first BN, the first container 220 in selectable fluid communication with the blender 210; a second container 230 for containing a second fluid having a second kinematic viscosity and a second BN, the second container 230 in selectable fluid communication with the blender 210; a third container 250 for containing a third fluid having a third kinematic viscosity and a third BN, the third container 250 in selectable fluid communication with the blender 210; and a controller 240 configured to determine an amount of first fluid, an amount of second fluid, and an amount of third fluid to supply to the blender 210 for providing a cylinder oil having a desired target viscosity and a target BN, the target kinematic viscosity equal to or less than 14 mm$^2$/s.

More specifically, the apparatus 20 comprises one or more pumps for pumping fluid through the system. The one or more pumps can take any suitable form. The one or more pumps are optionally provided along with respective valves for controlling fluid flow (not shown). In the absence of such valves, the one or more pumps are used for selective fluid communication between elements of the apparatus, e.g. selective fluid communication between each container 220, 230, 250 and the blender 210, as the pump controls the flow of fluid from each container 220, 230, 250 to the blender 210. Although in some examples there may be flow or backflow through the pump when not operational (e.g. when the pump is not pumping), such flow or backflow is of a small magnitude such that it does not materially affect the amount of fluid provided to the blender 210. Thus, each of the containers 220, 230, 250 is in selectable fluid communication with the blender 210.

In this example, the apparatus 20 comprises a pump 222 for pumping first fluid from the first container 220 to the blender 210. The pump 222 is selectively controlled by the controller 240, described further herein. The first container 20 corresponds to the first container of the apparatus 10 depicted in FIG. 2, adapted as necessary to function in the apparatus according to the example depicted in FIG. 3.

The apparatus 20 comprises a pump 232 for pumping second fluid from the second container 230 to the blender 210. The pump 232 is selectively controlled by the controller 240, described further herein. The second container 230 corresponds to the second container 130 of the apparatus 10 depicted in FIG. 2, adapted as necessary to function in the apparatus according to the example depicted in FIG. 3.

The apparatus 20 comprises a pump 252 for pumping third fluid from the third container 250 to the blender. The pump 232 is selectively controlled by the controller 240, described further herein.

In examples, the third container 250 contains third fluid, such as base oil. A base oil is an oil typically suitable for combining with other components for providing a lubrication product. The base oil typically has a kinematic viscosity of from 4 to 7 $mm^2/s$. The third container 250 is typically a storage tank for storing base oil. In examples, the base oil is a virgin base oil (e.g. has not been used to lubricate a machine component). In other examples, the base oil is a used or recycled base oil (e.g. has been used to lubricate a machine component, optionally having had additives and/or contaminants removed before supplying to the blender 210).

In some examples (not shown), the pump 222 for pumping first fluid and/or the pump 232 for pumping second fluid and/or the pump 252 for pumping third fluid are omitted. For example, they are replaced with valves, and the first fluid and/or second fluid and/or third fluid flow to the blender 210 under the influence of gravity or by virtue of another pump of the apparatus 20 operating.

In other examples (not shown), rather than each container 220, 230, 250 being connected to the blender 210 via respective pumps, each of the containers 220, 230, 250 is connected to the blender 210 via one pump which is selective connected and disconnected from each of the containers 220, 230, 250, and the pump is fluidly connected to one inlet of the blender 210. In operation, for example, the pump is connected to the first container 220 and disconnected from the second 230 and third 250 containers, and pumps an amount of first fluid from the first container 220 to the blender 210. Subsequently, the pump is disconnected from the first container 220 and connected to the second container 230, and pumps an amount of second fluid from the second container 230 to the blender 210. Subsequently, the pump is disconnected from the second container 230 and connected to the third container 250, and pumps an amount of third fluid from the third container 250 to the blender 210.

As with the example depicted in FIG. 2, the apparatus 20 comprises a controller 240 for controlling the apparatus 20.

The controller 240 is provided with an algorithm that determines the required proportions of first fluid (e.g. system oil), second fluid (e.g. additive package), and optionally third fluid (base oil) that results in a prepared cylinder oil in the blender 210 having a kinematic viscosity within a target kinematic viscosity range. For example, the controller 240 comprises a non-transitory computer-readable medium storing instructions that, when executed by a processor of the controller 240 (not shown), cause the processor to determine the required proportions of first fluid, second fluid, and third fluid to provide a prepared cylinder oil having a kinematic viscosity within a target kinematic viscosity range.

The controller 240 is configured to control the blender 210 and the pumps 222, 232, 252 to deliver the appropriate amount of the respective fluids to the blender 210. For example, the controller 240 is configured to cause each pump to operate for a period of time such that the appropriate amount of fluid is provided to the blender 210, according to the required proportions of fluid determined by the controller 240.

In examples, the controller 240 is configured to recalculate the ratio of fluids for providing a second cylinder oil having a different viscosity and/or BN. For example, after blending a first cylinder oil, upon the controller 240 receiving data indicative of a change of temperature of the cylinder liner and/or a change of sulfur content of the fuel, and/or data from an input data generator (such as a user input device or a sensor) the controller 240 is configured to determine the required proportions of first fluid, second fluid, and (optionally) third fluid that results in a second cylinder oil having a suitable kinematic viscosity and/or suitable BN for lubricating the cylinder liner under the changed conditions, the kinematic viscosity and/or BN different from the first cylinder oil.

The controller 240 receives data indicative of information about the engine from one or more input data generators for generating data indicative of information about the engine. In examples, at least some of the data is provided by one or more sensors for detecting parameters. In examples, at least some of the data is provided from a memory comprising information provided by a user, e.g. by inputting data with a user input device provided as part of a user interface (not shown). In examples, at least some of the data is obtained from look-up tables comprised in a memory of the controller 240.

The controller 240 is communicatively connected to, and for receiving data from, one or more input data generators of an input data generator array 280. Each input data generator provides data to the controller 240 indicative of an engine operation parameter and/or an engine condition parameter. Typically, each input data generator is a sensor for sensing an engine operation parameter or engine condition parameter (or a parameter indicative to said parameter), or is a memory containing data indicative of the engine operation parameter or engine condition parameter. For example, an input data generator may comprise a memory into which has been entered data indicative of a parameter (e.g. the sulfur content fuel being supplied to the engine 4) that can be communicated to the controller 240. The input data generator or the controller 240 typically determines the engine operation parameter or engine condition parameter based on the data received from the memory and a lookup table stored in the controller 240 or the input data generator.

In FIG. 3, the input data generator array 280 comprises: an input data generator 282 for generating data indicative of the sulfur content of the fuel; an input data generator 284 for generating data indicative of engine load of the engine 4; an input data generator 286 for generating data indicative of engine speed of the engine 4; an input data generator 288 for generating data indicative of the relative air humidity in the cylinder; an input data generator 290 for generating data indicative of the cylinder ferrous wear emission; an input data generator 292 for generating data indicative of the cylinder lubricant residual BN; and an input data generator 294 for generating data indicative of the cylinder oil liner temperature. In examples, one or more of the input data generators is a user input device comprised in a user interface.

In examples, the input data generator is a sensor for sensing an engine operation parameter or engine condition parameter and generating data indicative of the parameter, or a sensor for sensing a parameter related to an engine operation parameter or engine condition parameter based on which the sensor and/or the controller 240 determines the engine operation parameter or engine condition parameter. For example, the input data generator 282 for generating data indicative of the sulfur content of the fuel is a fuel sensor for sensing a property of the fuel oil to be provided to the engine 4 such as, for example, the sulfur content of the fuel oil (e.g. an inline or offline X-ray fluorescence sulfur-in-oil analyser); the input data generator 288 for generating data indicative of the relative air humidity is a hygrometer arranged in or near a cylinder of the engine 4 for sensing relative air humidity; the input data generator 290 for generating data indicative of the cylinder ferrous wear emission is a magnetometer arranged to detect ferrous wear emission in the cylinder; the input data generator 292 for generating data indicative of the cylinder lubricant residual BN is an infrared spectrometer arranged to analyse cylinder oil in the cylinder; the input data generator 294 for generating data indicative of the cylinder oil liner temperature is a temperature sensor for sensing temperature arranged in or near a cylinder of the engine 4, such as a thermometer, thermocouple, thermistor or the like.

In other examples, the controller 240 is communicatively connected to, and for receiving data from, any combination of the input data generators described hereinabove.

In other examples (not shown), the controller 240 is configured to receive data indicative of a fluid condition parameter in respect of the system oil, the additive packet, the base oil, the produced cylinder oil, or any combination thereof. The controller 240 is communicatively connected to, and for receiving data from, one or more input data generators indicative of a fluid condition parameter. Typically, each input data generator is a sensor for sensing a fluid condition parameter (or a parameter indicative to said parameter), or is a memory containing information regarding the fluid condition parameter.

Fluid condition parameters include the kinematic viscosity, the alkalinity (BN), and/or the temperature of fluid. In examples, the input data generator for generating data indicative of kinematic viscosity is a viscosity sensor arranged to detect the kinematic viscosity of a fluid; the input data generator for generating data indicative of alkalinity is an infrared spectrometer arranged to detect the alkalinity of a fluid; the input data generator for generating data indicative of the fluid temperature is a temperature sensor for sensing temperature arranged in or near a fluid, such as a thermometer, thermocouple, thermistor or the like.

In examples, the controller 240 is configured to obtain or determine the target BN for the first and/or second cylinder oil. The controller 240 is configured to receive information (e.g. data from an input data generator 282 indicating the sulfur content of the fuel) and determine the target BN from a look-up table stored in a memory the controller 240 or by using an algorithm stored in a memory of the controller 240.

The blender 210 is in selectable fluid communication with a storage tank 260 for storing the cylinder oil prepared in the blender. The storage tank 260 is, for example, a day tank. A pump 212 is arranged between the blender 210 and the storage tank 260 for pumping the prepared cylinder oil to the storage tank 260. The controller 240 is configured to selectively cause the pump 212 to pump prepared cylinder oil from the blender 210 to a storage tank 260. In other examples (not shown), the controller 240 is not communicatively connected to the pump 212, which is instead controlled by a separate controller.

The storage tank 260 is in selectable fluid communication with the cylinder liner 270 of the engine 4. A pump 262 is arranged between the storage tank 260 and the cylinder liner 270 for pumping the stored cylinder oil from the storage tank 260 to the cylinder liner 270. In the example of FIG. 3, the pump 262 is controlled by a controller which is not part of the blending apparatus 20. In other examples (not shown), the controller 240 of the blending apparatus 20 is configured to selectively cause the pump 262 to pump stored cylinder oil from the storage tank 260 to the cylinder liner 270.

In other examples (not shown), the storage tank 260 is omitted, and the blender 210 is fluidly connected to the cylinder liner 270 via a pump, such that the prepared fluid is provided to the cylinder liner 270 directly from the blender 210.

Figure 4:
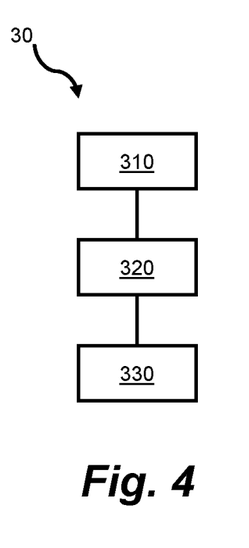
FIG. 4 shows a flow chart illustrating an example of a method of producing one or more cylinder oils according to an embodiment of the present invention.

FIG. 4 shows a flow chart illustrating a method for producing one or more cylinder oils of varying kinematic viscosity for a marine reciprocating internal combustion engine according to an example. The method 30 comprises providing 310 a first fluid having a first kinematic viscosity and a first BN; providing 320 a second fluid having a second kinematic viscosity and a second BN, the second kinematic viscosity different from the first kinematic viscosity; and 330 blending the first fluid and the second fluid in a first ratio to produce a first cylinder oil having a kinematic viscosity equal to or less than 14 mm$^2$/s at 100° C. In examples, the method 30 of FIG. 4 is carried out using an apparatus as described hereinabove.

The ratio of blending 330 is dependent on the amount of first fluid provided to the blender 110, 210 and the amount of second fluid provided to the blender 110, 210.

The providing 310 the first fluid typically comprises providing a controlled amount of first fluid from a first container 120, 220 containing first fluid, e.g. system oil. The controlled amount corresponds to the amount of first fluid required to blend the fluids in the first ratio. The providing 310 in examples is controlled by a controller 140, 240, e.g. the controller 140, 240 causes a pump to pump the amount of first fluid from the first container 120, 220 to the blender 110, 210. In other examples, the providing 310 is controlled manually, e.g. an operator operating a valve 122 or pump 222 to provide the controlled amount to the blender 110, 210.

The providing 320 the second fluid typically comprises providing a controlled amount of second fluid from a second container 130, 230 containing second fluid, e.g. additive packet. The controlled amount corresponds to the amount of second fluid required to blend the fluids in the first ratio. The providing 320 in examples is controlled by a controller 140, 240, e.g. the controller 140, 240 causes a pump to pump the amount of second fluid from the second container 130, 230 to the blender 110, 210. In other examples, the providing 320 is controlled manually, e.g. an operator operating a valve 132 or pump 232 to provide the controlled amount to the blender 110, 210.

The blender 110, 210 having received the controlled amounts of first fluid and second fluid, the blending 330 in the first ratio comprises operating the blender 110, 210 to mix the fluids together in the first ratio, thereby providing the first cylinder oil having a viscosity equal to or less than 14 mm$^2$/s at 100° C.

Figure 5:
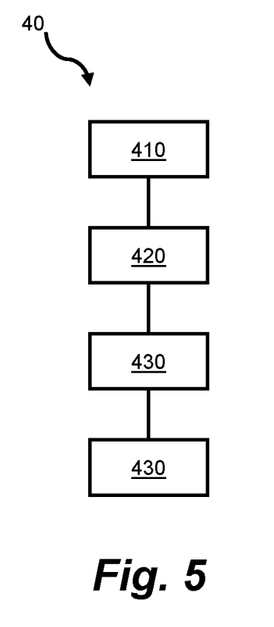
FIG. 5 shows a flow chart illustrating an example of a method of producing one or more cylinder oils according to another embodiment of the present invention.

FIG. 5 shows a flow chart illustrating another example of a method 40 for producing one or more cylinder oils of varying kinematic viscosity. The method 40 depicted in FIG. 5 may be carried out using, for example, the apparatus depicted in FIG. 3. The method 40 comprises determining 410, based on an engine operation parameter and/or an engine condition parameter, a target kinematic viscosity for the first cylinder oil. For example, the method comprises the controller 140, 240 receiving data indicative of an engine operation parameter and/or an engine condition parameter (e.g. from any of the input data generators of the input data generator array 280), optionally determining the parameter based on the data and a lookup table comprised in the memory of the controller 140, 240, and the controller 140, 240 determining, based on the parameter, a target kinematic viscosity for the first cylinder oil. In examples, the target kinematic viscosity for the first cylinder oil is 14 mm$^2$/s or less.

The method further comprises determining 420, based on a parameter set including at least the viscosity of the first fluid, the viscosity of the second fluid, and the viscosity of the third fluid, a target ratio range of the first fluid to the second fluid that corresponds to the target kinematic viscosity of the first cylinder oil. The controller 140, 240 typically comprises in its memory the kinematic viscosity of at least the first fluid, the second fluid, and the third fluid. In examples, the determining 420 comprises the controller 110, 210 determining, based on the kinematic viscosity of the first fluid, second fluid, and third fluid in its memory and a look-up table, a target ratio range of the first fluid to the second fluid. Typically, determining the target ratio range comprises determining a range of an amount of first fluid to provide to the blender 110, 210, and determining a range of an amount of second fluid to provide to the blender 110, 210. Optionally, the determining also comprises determining a range of an amount of third fluid to provide to the blender 110, 210.

The method further comprises determining 430, based on a parameter set including at least the BN of the first fluid, the BN of the second fluid, and the BN of the third fluid, a target ratio range of the first fluid to the second fluid that corresponds to the target BN of the first cylinder oil. The controller 140, 240 typically comprises in its memory the BN of at least the first fluid, the second fluid, and the third fluid. In examples, the determining 430 comprises the controller 110, 210 determining, based on the BN of the first fluid, second fluid, and third fluid in its memory and a look-up table, a target ratio range of the first fluid to the second fluid. Typically, determining the target ratio range comprises determining a range of an amount of first fluid to provide to the blender 110, 210, and determining a range of an amount of second fluid to provide to the blender 110, 210. Optionally, the determining also comprises determining a range of an amount of third fluid to provide to the blender 110, 210.

The method 40 further comprises providing 440 to the blender 110, 210 first fluid, second fluid and third fluid in a ratio which is set within the target ratio range that corresponds to the target kinematic viscosity of the cylinder oil and/or the target BN of the cylinder oil. Typically, the providing 440 in the ratio comprises providing controlled amounts of first fluid, second fluid, and third fluid to the blender 110, 210 such that, once the fluids are provided to the blender 110, 210, the blender 110, 210 comprises the fluids in the ratio.

The method 40 further comprises performing the blending 450 such that the cylinder oil has a kinematic viscosity equal to or less than 14 mm$^2$/s.

Figure 6:
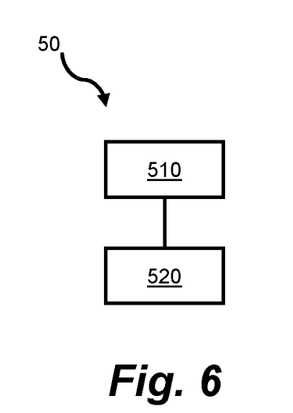
FIG. 6 shows a flow chart illustrating an example of a method of operating a marine reciprocating internal combustion engine according to an embodiment of the present invention.

FIG. 6 shows a flow chart illustrating a method 50 of operating a marine reciprocating internal combustion engine. The method 50 comprises producing a cylinder oil 510. The producing the cylinder oil 510 comprises carrying out any of the methods described hereinabove, such that the produced cylinder oil has a kinematic viscosity equal to or less than 14 mm$^2$/s at 100° C. The method 50 further comprises supplying 520 the produced cylinder to a cylinder of the marine reciprocating internal combustion engine, e.g. to the cylinder liner of the cylinder. The supplying typically comprises pumping produced cylinder oil from a storage tank 260 (e.g. a day tank) to the cylinder liner 270.

Example

A 12RT-flex96C-B engine having a power of 61776 kW was run for 53,267 hours with an average engine load of 10% maximum continuous rating, including periods of operation at 30% maximum continuous rating.

The engine was first operated over a first period using a cylinder oil having a kinematic viscosity of 16.2 mm$^2$/s ("reference cylinder oil") to provide baseline date corresponding to known cylinder oils.

Thereafter, cylinder oils having viscosities set out in Table 1 were produced onboard and provided to the cylinder liner of the engine during operation:

TABLE 1

| Kinematic viscosity at 100° C. (mm$^2$/s) |
| --- |
| 12.9 |
| 10.8 |
| 10.2 |
| 9.9 |
| 9.7 |
| 9.6 |

After running the engine with the cylinder oils described above, the cylinder liners were assessed for abrasive wear, adhesive wear and corrosive wear. The results of the assessment are shown in Table 2.

TABLE 2

| Wear Mode | Assessment method | Results |
| --- | --- | --- |
| Abrasive | Magnetometer-based ferrous wear debris sensor (LINERSCAN ®) | Iron values remained well below 200 ppm in operation |
|  | Piston underside inspection (visual) | No sign of additional abrasion or abrasion scratches |
| Adhesive | In-Cylinder thermocouples system (MAPEX-PR ®) | Liner wall temperature did not indicate the occurrence of micro-scuffing event. No high temperature alarm was triggered |
|  | Piston underside inspection (visual) | No sign of adhesive scoring or material adhesive transfer |
| Corrosive | X-ray Fluorescence analyzer (SEAMate ® XRF analyzer) | Iron values remained below 200 ppm |
|  | Piston underside inspection (visual) | No sign of new corroded areas on cylinder liner or on piston rings. |

As shown in Table 2, the second period of operating the engine using reduced-viscosity cylinder oils did not result in any increase in wear of the cylinder liner or piston rings.

Fuel consumption was calculated for the first period of operation using the reference cylinder oil, and for the second period of operation using the reduced-kinematic viscosity cylinder oils. Fuel consumption in the second period of operation was 2 g/KWH lower than the first period, corresponding to a fuel consumption reduction of 1%.

In other embodiments, two or more of the above described embodiments may be combined. In other embodiments, features of one embodiment may be combined with features of one or more other embodiments.

Embodiments of the present invention have been discussed with particular reference to the examples illustrated. However, it will be appreciated that variations and modifications may be made to the examples described within the scope of the invention.

What is claimed is:

1. A method for producing one or more cylinder oils of varying kinematic viscosity for a marine reciprocating internal combustion engine, the method comprising:
   providing a first fluid having a first kinematic viscosity and a first BN, wherein the first fluid is a system oil, and the BN is from 5 to 30;
   providing a second fluid having a second kinematic viscosity and a second BN, wherein the second fluid is an additive package, fresh cylinder oil, or used cylinder oil, and the second kinematic viscosity is different from the first kinematic viscosity;
   providing a third fluid having a third kinematic viscosity and a third BN, the third fluid being a base oil and the third BN being less than 1, and
   blending the first fluid, the second fluid, and the third fluid in a first ratio to produce a first cylinder oil having a kinematic viscosity of 8 to 12.5 mm$^2$/s at 100° C.

2. The method of claim 1 comprising:
   determining, based on an engine operation parameter and/or an engine condition parameter, a target kinematic viscosity for the first cylinder oil;
   determining, based on a parameter set including the first kinematic viscosity and second kinematic viscosity, a target ratio range of the first fluid to the second fluid that corresponds to the target kinematic viscosity of the first cylinder oil; and
   performing the blending of the first fluid and second fluid such that the first ratio is set within the target ratio range that corresponds to the target kinematic viscosity of the first cylinder oil.

3. The method of claim 2 comprising:
   determining, based on an engine operation parameter and/or an engine condition parameter, a target BN for the first cylinder oil;
   determining, based on a parameter set including at least the first BN, the second BN, and the third BN, a target ratio range of the first fluid to the second fluid that corresponds to the target BN of the first cylinder oil; and
   performing the blending such that the first ratio is set within the target ratio that corresponds to the target BN of the first cylinder oil.

4. The method of claim 1, further comprising producing a second cylinder oil having a kinematic viscosity greater than the kinematic viscosity of the first cylinder oil by blending the first fluid and the second fluid in a second ratio different from the first ratio.

5. The method of claim 4, wherein the first cylinder oil has a BN different from the second cylinder oil.

6. The method of claim 2, wherein the engine operation parameter or engine condition parameter is at least one of: fuel sulfur-content; engine load; engine speed; relative air humidity; cylinder ferrous wear emission; total iron cylinder lubricant residual BN; and cylinder oil liner wall temperature.

7. The method of claim 1, wherein at least one of the first fluid or the second fluid is an at least partially used oil.

8. A method of operating a marine reciprocating internal combustion engine, the method comprising:
   producing a cylinder oil by:
   providing a first fluid having a first kinematic viscosity and a first BN, wherein the first fluid is a system oil, and the first BN is from 5 to 30;
   providing a second fluid having a second kinematic viscosity and a second BN, wherein the second fluid is an additive package, fresh cylinder oil, or used cylinder oil, and the second kinematic viscosity different from the first kinematic viscosity,
   providing a third fluid having a third kinematic viscosity and a third BN, the third fluid being a base oil and the third BN being less than 1; and
   blending the first fluid, the second fluid, and the third fluid in a ratio to produce a cylinder oil having a kinematic viscosity of 8 to 12.5 mm$^2$/s at 100° C.; and
   supplying the cylinder oil to a cylinder of the marine reciprocating internal combustion engine.

9. The method of claim 8, wherein the kinematic viscosity of the cylinder oil is lower than the manufacturer's recommended minimum cylinder oil kinematic viscosity for the marine reciprocating internal combustion engine.

10. The method of claim 8, wherein the marine reciprocating internal combustion engine is operating at an engine load of 60% or less.

11. The method of claim 1, wherein the marine reciprocating internal combustion engine is a two-stroke crosshead engine.

12. An apparatus for the preparation of a cylinder oil comprising:
    a blender;
    a first container for containing a first fluid having a first kinematic viscosity and a first BN, wherein the first fluid is a system oil and the first BN is from 5 to 30, the first container in selectable fluid communication with the blender;
    a second container for containing a second fluid having a second kinematic viscosity and a second BN, wherein the second fluid is an additive package, fresh cylinder oil, or used cylinder oil and the second kinematic viscosity is different from the first kinematic viscosity, the second container in selectable fluid communication with the blender;
    a third container for containing a third fluid having a third kinematic viscosity and a third BN, the third fluid being a base oil and the third BN being less than 1; and
    a controller configured to determine an amount of first fluid, an amount of second fluid, and an amount of third fluid to supply to the blender for providing a cylinder oil having a desired target viscosity and a target BN, wherein the target kinematic viscosity is 8 to 12.5 mm$^2$/s at 100° C.

13. A marine vessel comprising an apparatus, the apparatus comprising:
    a blender;
    a first container for containing a first fluid having a first kinematic viscosity and a first BN, wherein the first fluid is a system oil and the first BN is from 5 to 30, the first container in selectable fluid communication with the blender;
    a second container for containing a second fluid having a second kinematic viscosity and a second BN, wherein the second fluid is an additive package, fresh cylinder oil, or used cylinder oil and the second kinematic viscosity is different from the first kinematic viscosity, the second container in selectable fluid communication with the blender;
a third container for containing a third fluid having a third kinematic viscosity and a third BN, the third fluid being a base oil and the third BN being less than 1; and
a controller configured to determine an amount of first fluid, an amount of second fluid, and an amount of the third fluid to supply to the blender for providing a cylinder oil having a desired target viscosity and a target BN, wherein the target kinematic viscosity is 8 to 12.5 $mm^2/s$ at 100° C.

\* \* \* \* \*